United States Patent
Lustig et al.

(10) Patent No.: US 7,661,421 B1
(45) Date of Patent: Feb. 16, 2010

(54) WOK SUPPORT RING AND DEVICES FOR IMPARTING A ROCKING MOTION TO A WOK

(75) Inventors: Robert Lustig, Dove Canyon, CA (US); Frederick Thomas, Riverside, CA (US); Larry Behm, Laguna Hills, CA (US)

(73) Assignee: Panda Restaurant Group, Inc., Rosemead, CA (US)

( * ) Notice: Subject to any disclaimer, the term of this patent is extended or adjusted under 35 U.S.C. 154(b) by 637 days.

(21) Appl. No.: 11/134,233

(22) Filed: May 20, 2005

(51) Int. Cl.
F24C 15/10 (2006.01)
A47J 37/10 (2006.01)
A47J 36/04 (2006.01)

(52) U.S. Cl. .................. 126/215; 126/25 R; 126/9 R; 126/50; 126/38; 248/148; 248/346.03; 248/315; 248/306.3; 248/676

(58) Field of Classification Search ........... 126/215, 126/25 R, 9 R, 50, 41 R, 305; 219/438, 429, 219/432; 248/148, 346.03, 346.5, 315, 676
See application file for complete search history.

(56) References Cited

U.S. PATENT DOCUMENTS

| 1,316,365 | A | * | 9/1919 | Jackson ................. 99/450 |
|---|---|---|---|---|
| 4,062,341 | A | | 12/1977 | Panzarella |
| 4,313,416 | A | | 2/1982 | Lau |
| D269,319 | S | | 6/1983 | Fox |
| D276,493 | S | | 11/1984 | Cesaroni |
| D276,689 | S | | 12/1984 | Spoeth, Jr. |
| 4,491,235 | A | | 1/1985 | Fournier et al. |
| 4,555,616 | A | | 11/1985 | O'Brien |
| 4,607,613 | A | | 8/1986 | Toldi |
| D287,326 | S | | 12/1986 | Joseph |
| 4,666,727 | A | | 5/1987 | Wang |
| D302,096 | S | | 7/1989 | Anderson |
| 4,873,921 | A | | 10/1989 | Piane, Sr. |
| 4,889,103 | A | | 12/1989 | Fraioli |
| 4,919,950 | A | | 4/1990 | Mak |
| D317,549 | S | | 6/1991 | Stadelmaier |
| 5,032,699 | A | | 7/1991 | Hu |
| D326,029 | S | | 5/1992 | Lok |
| 5,129,314 | A | | 7/1992 | Hu |
| 5,158,067 | A | | 10/1992 | Dutro et al. |
| 5,226,406 | A | | 7/1993 | Reynolds |

(Continued)

FOREIGN PATENT DOCUMENTS

DE EP1029486 * 12/2000

*Primary Examiner*—Steven B McAllister
*Assistant Examiner*—Nikhil Mashruwala
(74) *Attorney, Agent, or Firm*—Fulwider Patton LLP (57) ABSTRACT

A wok support ring supports the weight of a wok and food items to be cooked in the wok and imparts a rocking motion to the wok as it is moved in a back and forth motion by the worker. A wok rocking device includes the use of a wok support base which moves in a rocking motion via cam tracks with roller followers. When the worker pulls the wok in a back and forth motion, the rollers follow the cam track to cause the wok to rise rapidly and then rock forward near the end of the stroke. A wok rocking device also can utilize movable linkages attached to a wok support base in order to create the rocking motion needed to mix and fold the food items within the wok.

8 Claims, 5 Drawing Sheets

U.S. PATENT DOCUMENTS

| | | |
|---|---|---|
| 5,239,916 A | 8/1993 | Hu |
| 5,241,900 A | 9/1993 | Piane, Sr. |
| 5,242,060 A | 9/1993 | Chiang et al. |
| 5,315,983 A * | 5/1994 | Law .......................... 126/216 |
| 5,385,085 A | 1/1995 | Piane, Sr. |
| D368,827 S | 4/1996 | Thomas |
| 5,558,008 A | 9/1996 | Jenkins |
| 5,687,642 A | 11/1997 | Chao |
| 5,775,316 A | 7/1998 | Jones |
| 5,850,779 A * | 12/1998 | Zimmerman ................. 99/425 |
| D436,287 S | 1/2001 | Choi |
| D438,422 S | 3/2001 | Choi |
| 6,360,653 B1 * | 3/2002 | Rodek et al. .................. 99/339 |
| D463,215 S | 9/2002 | Huang et al. |
| 6,552,306 B1 | 4/2003 | Edmonds |
| D479,432 S | 9/2003 | Barker |
| 6,718,967 B2 | 4/2004 | Luther |
| D500,630 S | 1/2005 | Brasset |
| 2003/0121512 A1 * | 7/2003 | Luther ...................... 126/41 R |
| 2004/0025710 A1 | 2/2004 | Conley |
| 2004/0060456 A1 | 4/2004 | Chung |
| 2004/0159244 A1 | 8/2004 | Leason |

* cited by examiner

WOK SUPPORT RING AND DEVICES FOR IMPARTING A ROCKING MOTION TO A WOK

BACKGROUND OF THE INVENTION

The present invention relates generally to food preparation devices and, more particularly, to a wok support ring and other devices for reducing the amount of lifting and physical effort needed to moving a wok during cooking.

A wok is generally in the form of a bowl like utensil in which foods are rapidly cooked while being stirred. A wok generally has a curved interior and somewhat curved exterior surface and is primarily intended to be used with a flame or charcoal heat source as opposed to a heat source having a flat heat transferring surface, particularly those of smooth top electric stove heating surfaces. Moreover, the smooth cooking surface makes it possible to cook using a minimum amount of fats and oil since the food items to be cooked may be moved into the heated oil very easily.

Woks also are typically used for cooking for very short time periods at high heats. In a typical stir fry recipe, the cooking time can be four minutes or less. In addition to health benefits, the flavor in the food items, particular in vegetables, is substantially retained by the high temperature sealing of the surfaces. This allows the flavors and juices of the food items to remain inside for maximum concentration.

Since typical cooking with a wok requires the food to be subjected to high temperatures for short period of times, the high temperature requirement means that food will burn easily if not turned and folded frequently. Two typical methods for folding or turning the food items are either a rocking motion in which the wok is rapidly moved back and forth in a somewhat rocking motion, or through the use of utensils such as a spatula or spoon to fold and stir the food. A hybrid approach of rocking the wok while using the utensil is also known. All current methods of cooking with a wok requires a significant amount of skill and training.

Commercial cooking woks tend to be large and can become quite heavy when loaded with food. The weight and motion combine to make this style of cooking very difficult to execute. In a commercial setting, the worker must be trained for long periods of time to achieve quality results. Holding a heavy wok and moving it over the cooking flame can be quite difficult and may expose a worker to the risk of burns. Additionally, repetitive motion injuries to the wrist and hand can be experienced as well.

What has been needed is a device which can be used with a cooking wok that reduces the amount of skill and training required in order to make high quality of food while using a wok. Additionally, such a device should improve the ability of the worker to hold and handle the wok during cooking to help eliminate worker discomfort associated when moving the wok to fold and mix the food within the pan of the wok. The present invention disclosed herein satisfied these and other needs.

SUMMARY OF THE INVENTION

The present invention is directed to devices which can be utilized in conjunction with a cooking wok that allows the worker to move the wok back and forth rapidly over a cooking flame without having to support the full weight of the wok. Accordingly, the present invention reduces the skill and training necessary to cook high quality food in a wok. In one aspect, the present invention is directed to a stationary wok support ring which sits over a cooking heat source and supports the wok. The wok support ring has a particular shape which causes the wok to rise rapidly and rock forward and backward slightly as the wok is moved back and forth across the surface of the wok support ring. In this aspect of the invention, the correct motion to properly turn and mix the food items can be achieved due to the shape and construction of the wok support ring. Various ring designs can be implemented to achieve the desired rocking motion which is imparted to the wok.

In one particular aspect of the present invention, the wok support ring has a substantially tear drop configuration with the widest section of the wok support ring being concentrically situated over the cooking flame or heat source. The narrow section of the tear drop configuration would be positioned near the worker. This narrow section of the ring may have an angled elevation depending upon the height and geometry of the range. The angle may be either above or below the horizontal plane of the wide section of the ring. In use, the worker simply pulls the wok towards himself/herself which creates a rapid rise in the wok, followed by a slight forward rocking motion. The different diameters and transitions regions of the tear drop shape of the wok support ring causes the rising and rocking motion on the wok since the pan of the wok sits differently on the ring at various locations along the length of the ring. This combination of motions causes the food item in the wok to slide towards the rear of the wok pan and then launch towards the center cooking region of the wok pan, thereby causing the food items to properly turn and mix before falling back onto the bottom of the wok for continuous heating and cooking.

One particular aspect of the present invention, the wide section of the wok support ring has a radius of approximately 65% of the diameter of the wok, while the diameter of the small section of the ring is approximately 40% of the wok's diameter. The wok's diameter is generally measured as the diameter of the wok pan. Additionally, the small section of the ring can be angled below the horizontal plane from a range of about 0°-15°. It should be appreciated that other diameters and combination of diameters could be used to achieve a desired rocking motion. Additionally, in another aspect of the present invention, the support surface of the support ring can be either substantially straight or can have peaks and valleys which produces the rapid rise and rocking motion to the wok. Again, the worker simply creates the proper rocking motion by sliding the wok over the support surface of the support ring.

In another aspect of the present invention, a device for imparting a rocking motion to a wok can be made with a cam track and roller followers which create the desired motion for the wok. In this particular aspect of the wok rocking device, the wok is supported within a support base that is mounted within one or more cam tracks using roller followers or similar components which are capable of sliding within the cam track. When the worker pulls the wok towards him/her, the roller follows move within the cam tracks causing the support base and wok to follow the path of the cam tracks which imparts the rocking motion to the wok. In this manner, the weight of the wok and food items are fully supported by the wok rocking device and the necessary rocking motion is imparted to the wok by simply pushing and pulling the wok in a back-and-forth motion.

In yet another aspect of the present invention, the wok rocking device movable linkages which move the support base that supports the wok. In one particular aspect, the wok rocking device includes four linkages which are pivoted from the top of the cooking range. Two of the linkages are pivotally attached to the support base on each side of the support base.

The position and size of the linkages establishes a trajectory for the support base that achieves the desired motion imparted to the wok. The act of the worker simply pushing and pulling the wok in a back and forth motion again causes the support base and wok to follow the arcs created by the movement of the linkages.

These and other options and advantages of the present invention will become clear to those skilled in the art in view of the description of the invention, when taken in conjunction with the accompanying exemplary drawings.

DETAILED DESCRIPTION OF THE INVENTION

The present invention relates to devices used with cooking woks to impart a rocking motion to the wok. For the sake of illustration, the following embodiments are directed to certain configurations of cooking woks, although, it should be understood that the present invention is not limited to the embodiments described here. For example, the components of the wok support ring and wok rocking device may be formed into many different shapes and sizes and may be joined together in different manners, yet still achieve the objects of the present invention.

Figure 1:
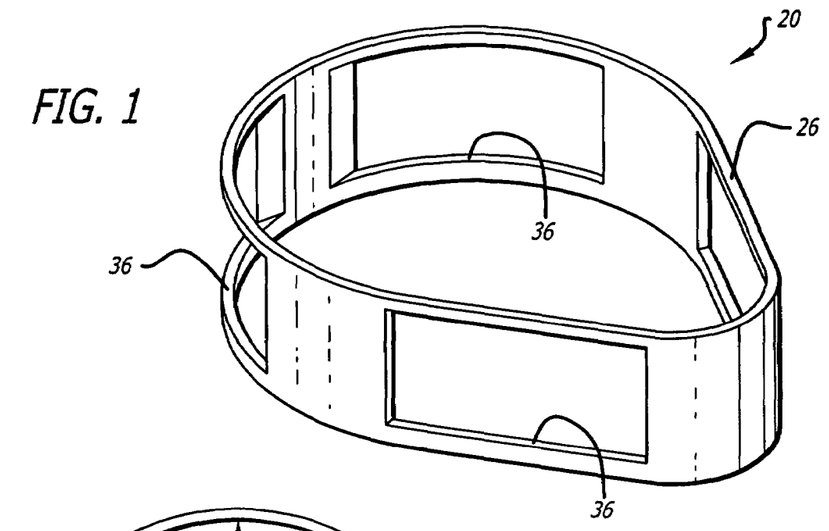
FIG. 1 is a perspective view of an embodiment of a wok support ring made in accordance with the present invention.
Figure 2:
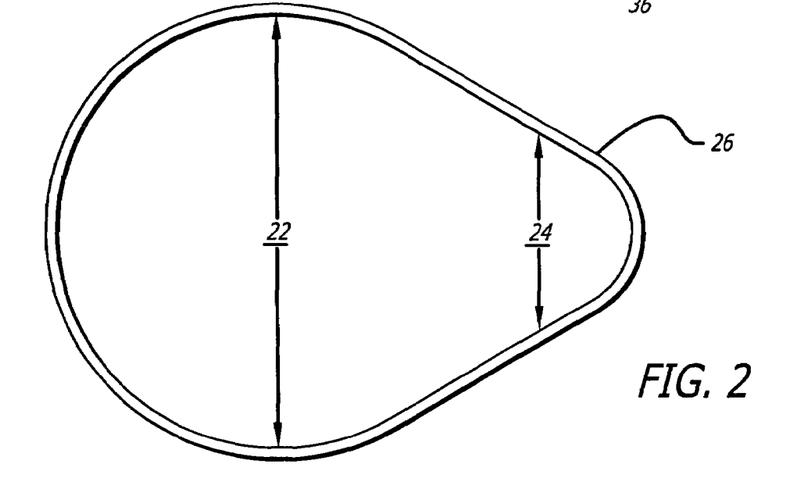
FIG. 2 is a top view of wok support ring of FIG. 1.
Figure 3:
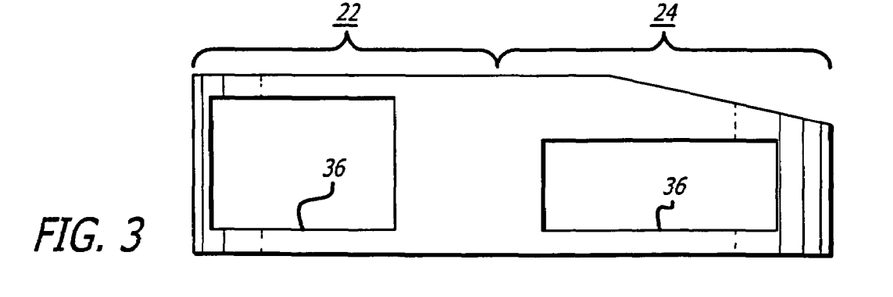
FIG. 3 is a side elevational view of the wok support ring of FIG. 1.
Figure 7:
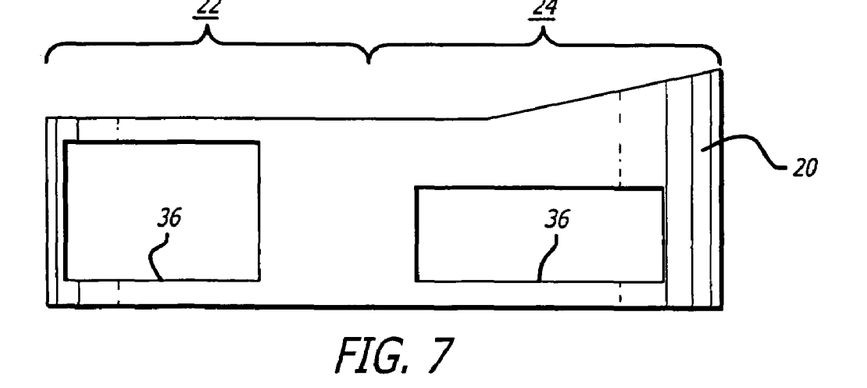
FIG. 7 is a side elevational view of another embodiment of a wok support ring.

Referring initially to FIGS. 1-3, an embodiment of a wok support ring 20 is shown. In this particular embodiment of the invention, the wok support ring 20 has a tear drop shape, as best seen in FIG. 2, with a wide section 22 of the ring 20 found to be concentrically situated over a cooking flame or heat source (not shown). A narrow section 24 of the ring 20 is positioned toward the worker. This narrow section 24 may have a region of angled elevation (see FIG. 3) depending upon the height and geometry of the range which supplies the heat source. This region of angled elevation may be either above (see FIG. 7) or below the horizontal plane of the wide section of the ring, as is shown in FIG. 3. This angled elevation can be about 15 degrees with the horizontal.

As can be seen in these Figures, the wok support ring 20 includes a top support surface 26 upon which the wok is mounted. In this particular embodiment of the invention, the wide section 22 of the support ring 20 has a radius of approximately 65% of the diameter of the wok to be used on the support ring 20. The diameter of the narrow section 24 of the support ring 20 can be approximately 40% of the wok's diameter. The wok's diameter is defined as the diameter of the wok at its top rim. In this fashion, as the wok sits in the wide section of 22 of the ring, it will sit lower and closer to the flame then when placed in the narrow section 24. This change in the diameter of the support ring 20 causes the wok to rise and rock as the worker moves the wok closer to himself/herself. It should be appreciated that the wide section and narrow section of the support ring can be made having many different combinations of diameters to achieve the desired lifting and rocking action.

Figure 4:
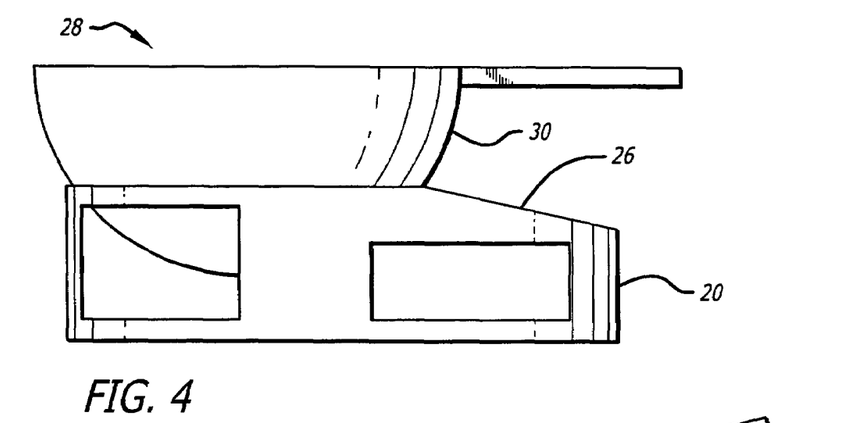
FIGS. 4-6 are a side elevational view showing the progression of a wok as it is moved along the wok support ring of FIG. 1
Figure 5:
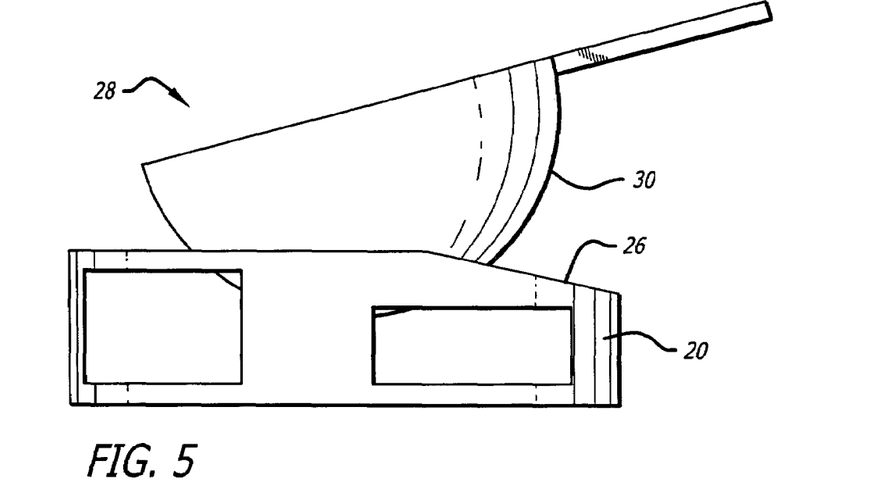
Figure 6:
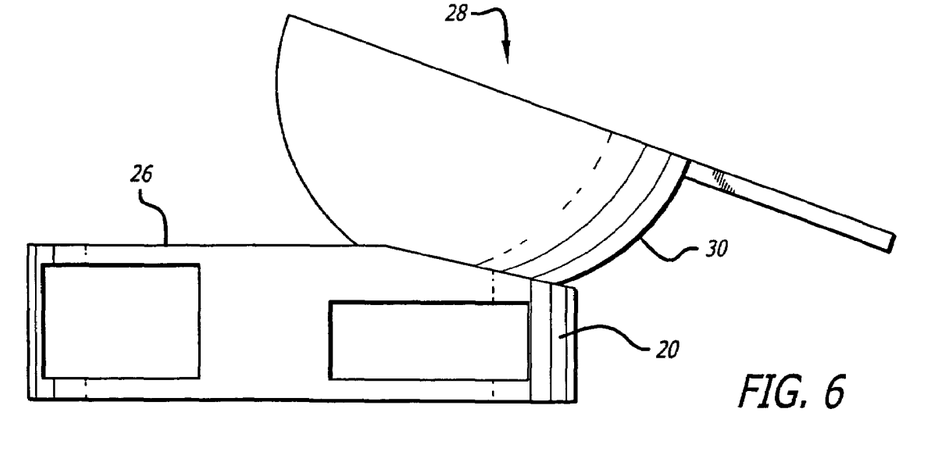

FIGS. 4-6 show a sequence of movements of a wok 28 over the wok support ring 20 depicted in FIGS. 1-3. In this manner, the entire weight of the wok and food items are placed on the support ring 20 and a worker can create the desired rocking motion by simply moving the wok back and forth. It should be appreciated that many other figurations and shapes of the support ring could be utilized in order to create the same rocking motion imparted when utilizing the embodiment of FIGS. 1-3.

Turning again specifically to FIGS. 4-6, the wok 28 is placed in the widest section 22 of the wok support ring 20 while it is heated along with the food items contained in the wok pan 30. When it is time to turn and fold the food items, the worker simply pulls the wok rapidly towards the narrow section 24 of the ring. This action again causes the wok 28 to rise rapidly as it moves towards the worker. The worker can then apply a slight downward motion near the narrow section 24 of the support ring 20 to abruptly stop the wok motion. This causes the food to rise and turn toward the center cooking area of the wok, creating the desired mixing and folding action needed to prevent the food items becoming burned. During this entire motion, the majority of the weight of the wok and food items are borne on the wok support ring 20 and thus, the worker does not have to lift the full weight, thereby reducing worker fatigue and the potential for wrist injuries.

Figure 8:
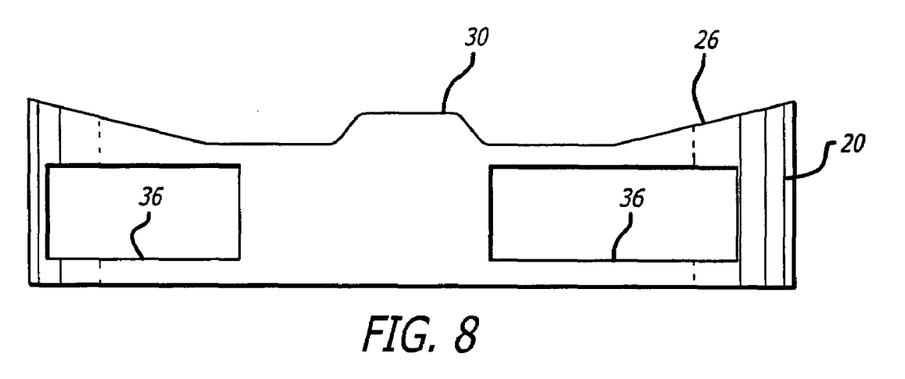
FIG. 8 is a side elevational view of another embodiment of a wok support ring.
Figure 9:
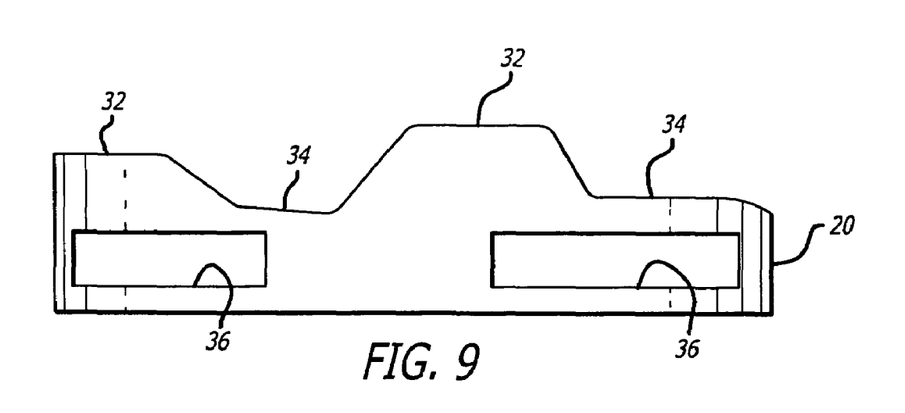
FIG. 9 is a side elevational view of another embodiment of a wok support ring.

The wok support ring 20 of FIGS. 1-3 should be made sufficiently large to fit over a cooking heat source such as a gas flame and sized to support the wok over the heat source. The height of the support ring would be determined by the work surface position of the cooking range. Again, numerous ring designs could be utilized to accomplish the same preferred motion of pulling the wok towards the worker to create a rapid rise in the wok followed by a slight forward rocking motion. The wok support ring may be fabricated from many suitable materials, such as cast iron. Moreover, the wok support ring 20 could be made with a top support surface 26 which is a non-uniform in height. For example, referring to FIG. 7, the narrow section could be placed at an inclined slope rather than the downward slope shown in FIG. 3. Moreover, as is shown in FIGS. 8 and 9, the top support surface 26 can be made with ridges 30 or slopes which causes the wok to move upward and downward to create a vigorous mixing action which may be desired when cooking certain food items. As can be seen in FIGS. 8 and 9, the profile of this top support surface 26 may include peaks 32 and valleys 34 which helps to create the desired rocking motion as the pan slides across the top support surface 26. When utilizing a top support surface 26 as shown in FIGS. 8 and 9, it is possible to utilize tear drop shaped ring although other shapes could be used since the peaks 32 and valleys 34 will cause the wok to rise and rock as it is slid across the top support surface 26. The wok support ring may include a number of vent openings 36 which extend into the wall of the support ring 20 in order to provide a sufficient amount of air to the heat source after the wok is placed on the support ring 20.

Figure 10:
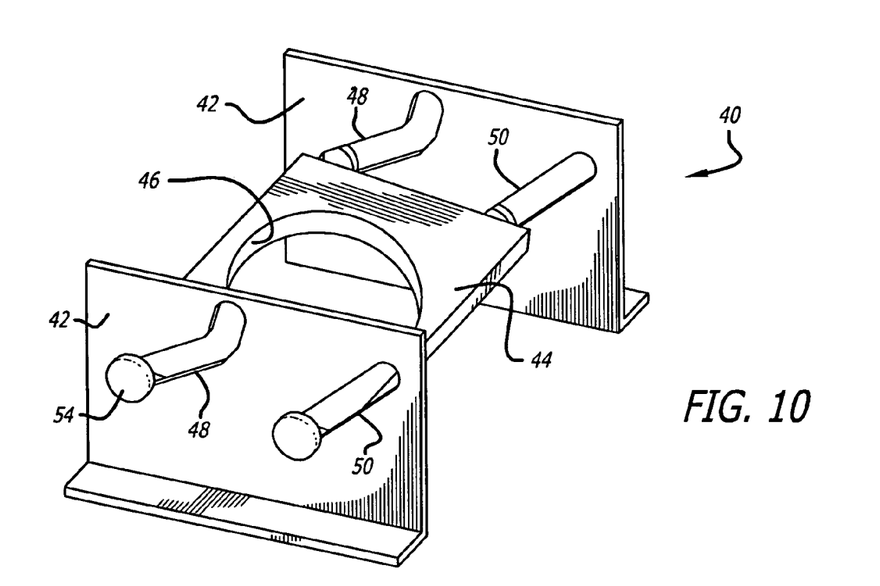
FIG. 10 is a perspective view of an embodiment of a wok rocking device for moving a wok in a rocking motion during cooking.

Referring now to FIGS. 10-13, another embodiment of the present invention is directed to a wok rocking device 40 which, like the wok support ring 20 shown in FIGS. 1-3, is designed to impart a rocking action to a wok. Referring initially to FIG. 10, the wok rocking device 40 includes a pair of sidewalls 42 which are attached to a wok support base 44 that is disposed between the pair of sidewalls 42. This wok support base 44 includes a circular opening 46 which is designed to receive the wok pan. This wok support base 44 is designed to extend over the heat source (not shown) during use and the weight of the wok 28 and food items are to be borne by this wok support base 44 and sidewalls 42.

Referring now to FIGS. 10-13, other features of the wok rocking device 34 are shown. Each of the sidewalls 42 includes a pair of cam tracks 48 and 50 which are utilized to impart rocking motion to the wok as the wok and wok support base 44 are moved in a backward/forward motion by the worker. Each of the cam tracks 48 and 50 are, in turn, in contact with a roller follower 52, or similar mechanical device component, which is slidably coupled within the cam tracks 48 and 50. An end cap 54 is attached to the roller follower 52 to prevent the roller followers from being displaced from either of the cam tracks 48 and 50.

Figure 13:
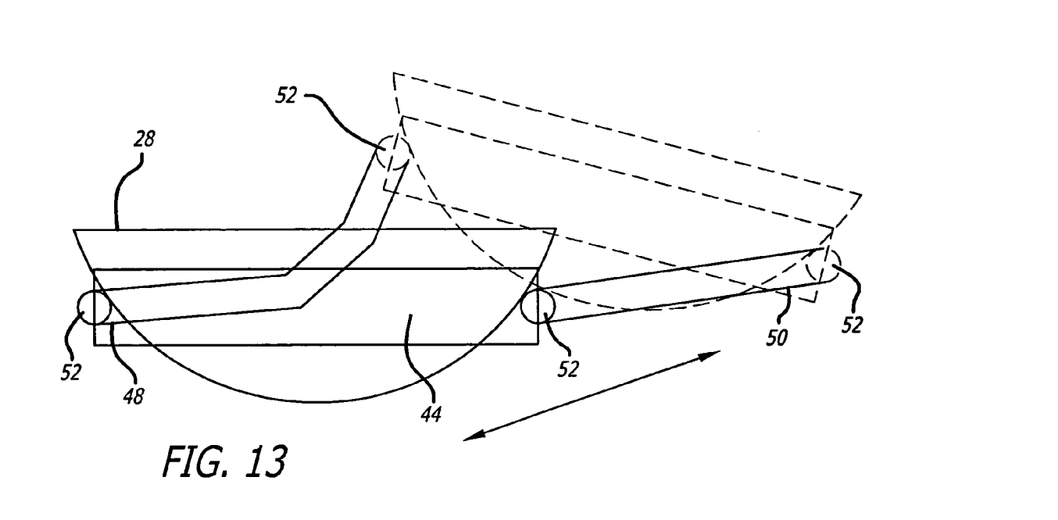
FIG. 13 is a schematic view which illustrates the cam tracks and roller followers of the wok rocking device of FIGS. 10-12.

As best seen in FIG. 13, the movement of the wok 28 (shown in phantom) and wok support base 44 in a backward/forward motion causes the wok 28 to rock as the roller followers move along the cam tracks 48 and 50. Since the cam tracks 48 and 50 have different configurations, one end 56 of the wok support base 44 will move more abruptly than the other end 58 which will cause an angular displacement that results in the wok being moved in a rocking manner, as is shown in FIG. 13. As a result, the wok 28 undergoes this rocking motion through the simple backward and forward motion by the worker. It should be appreciated that the rocking motion is attained while the wok rocking device 40 bears most of the weight of the wok and food items. As a result, less effort and skill is need to cook the food items.

Figure 11:
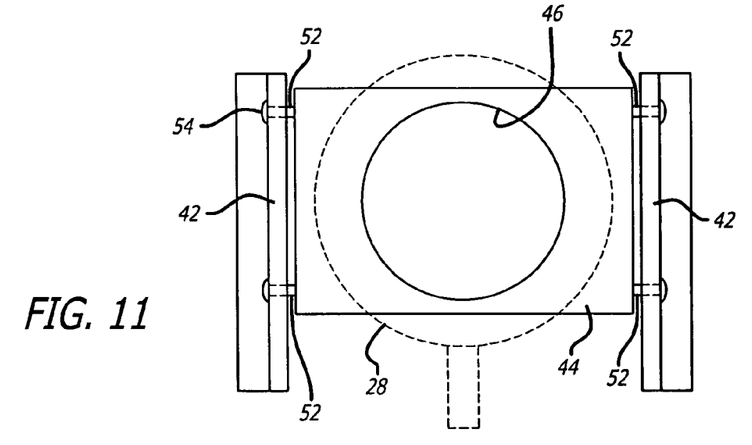
FIG. 11 is a top view of the wok rocking device of FIG. 11.
Figure 12:
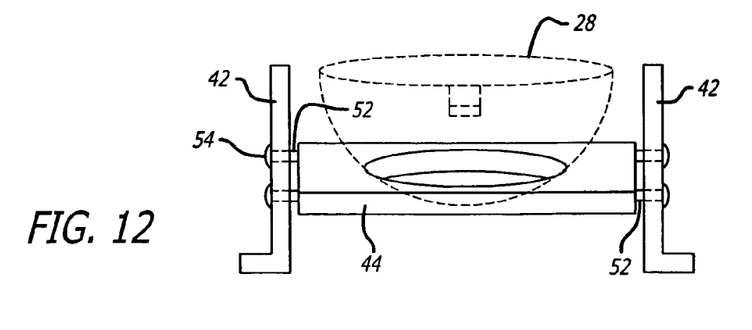
FIG. 12 is a side elevational view of the wok rocking device of FIG. 11.

It should be appreciated that the embodiment of FIGS. 10-13 shows one particular device for achieving a rocking motion utilizing cam tracks with roller followers. It should be appreciated that other types of components could also be utilized to implement this rocking motion using a track and follower. Additionally, the length and orientation of the cam tracks 48 and 50 can be varied, as needed, in order to create the desired rocking motion. The track itself could be formed as a slot in the sidewall, as shown in FIGS. 10-12, or can be a raised track which is attached to the sidewall. Additionally, the follower can be simply a stud which extends into the slot which forms the track and is slidably coupled therein. It will be appreciated to those skilled in the art that other tracks and slidable components could be implemented to achieve the desired lifting and rocking motion.

Figure 14:
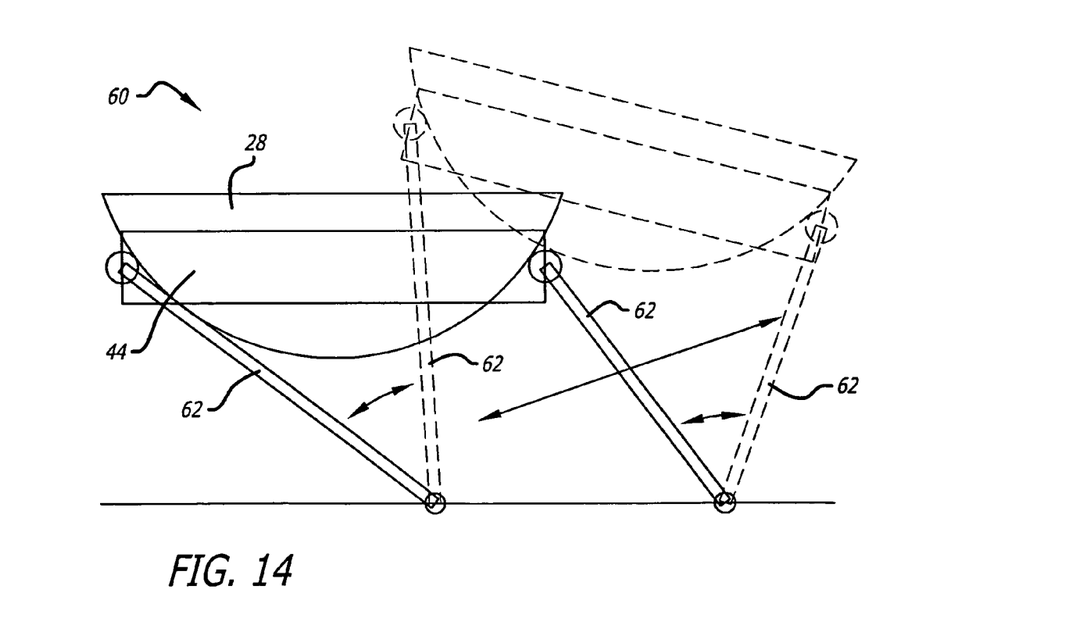
FIG. 14 is a side elevational view of another embodiment of a wok rocking device which uses movable linkages for imparting a rocking motion to a wok during cooking.

Referring now to FIG. 14, yet another embodiment of a wok rocking device 60 is shown. In this particular embodiment, the wok support base 44 is supported by movable linkages 62 (only two of which are shown in FIG. 14) which helps to achieve a lifting and rocking motion as wok support base 44 (via the wok handle) is moved in a back and forth motion by the worker. These linkages 62 have different lengths, as needed, in order to properly impart a rocking motion to the wok support base 44 and wok 28. It should be appreciated that FIG. 14 shows a conceptual way of creating the particular embodiment of a wok rocking device 60 and that other components (not shown) could be implemented to support the linkages 62. Alternatively, the linkages 62 could be directly attached to a base which surrounds the heat source, or alternatively, to the cooking range itself using mounting brackets well known in the art. These linkages 62 could be manufactured out of suitable material, such as cast iron, which is typically used in conjunction with cooking ranges associated with wok cooking.

Although the invention has been described in injunction with the illustrated embodiments, it would appreciated that various modification and alterations might be made by those skilled in the art without departing from the spirit and scope of the present invention.

We claim:

1. A device for supporting and imparting a rocking motion to a cooking wok, comprising:
   a support ring having a longitudinal length and a wide section having a diameter and a narrow section extending from the wider section, both the wide section and narrow section being capable maintaining a wok in a self-supported position on the support ring, the support ring including a plurality of vent holes; and
   a top support surface formed on the support ring upon which the wok sits, the length of the support ring allowing the wok to slide along the top support surface, wherein the configuration of the support ring causes the wok to rise and rock as the wok is slid across the top support surface, wherein the support ring has a uniform height which extends along its longitudinal length that causes the wok to rise along the top support surface as the wok is moved from the wide section to the narrow section.

2. A device for supporting and imparting a rocking motion to a cooking wok, comprising:
   a support ring having a longitudinal length; and
   a top support surface formed on the support ring upon which the wok sits, the length of the support ring allowing the wok to slide along the top support surface, wherein the configuration of the support ring causes the wok to rise and rock as the wok is slid across the top support surface, wherein the support ring has a tear-drop shape and includes a wide section and a narrow section, the wide section being larger in diameter than the narrow section, and wherein the support ring includes a plurality of vent holes.

3. A device for supporting and imparting a rocking motion to a cooking wok, comprising:
   a support ring having a longitudinal length and a wide section having a diameter and a narrow section extending from the wider section, both the wide section and narrow section being capable maintaining a wok in a self-supported position on the support ring;
   a top support surface formed on the support ring upon which the wok sits, the length of the support ring allowing the wok to slide along the top support surface, wherein the configuration of the support ring causes the wok to rise and rock as the wok is slid across the top support surface; and
   a wok having a top rim, the diameter of the wok being defined as the diameter of the top rim, the wide section of the support ring having a diameter of about 65% of the diameter of the wok and the narrow section having a diameter of about 40% of the wok diameter.

4. A device for supporting and imparting a rocking motion to a cooking wok, comprising:
   a support ring including a wide section having a width and a narrow section extending longitudinally from the wider section, the wide and narrow sections having a longitudinal length which is larger than the width of the wide section, both the wide and narrow sections being capable of maintaining a wok in a self-supported position on the support ring; and a top support surface formed on the support ring upon which the wok sits, the wok being slidable along the top support surface to cause the wok to rise or lower as the wok is slid across the top support surface, wherein the top surface includes a first region which lies generally in a plane and a second region which is at an angle with the plane of the first region.

5. The device of claim 4, wherein the portion of the top surface of the support ring which lies generally in a plane has a uniform height which extends along its longitudinal length that causes the wok to rise along the top support surface as the wok is moved from the wide section to the narrow section.

6. The device of claim 4, further including at least one vent opening formed in the support ring.

7. The device of claim 4, wherein the second region of the top surface of the support ring forms a peak above the plane of the first region.

8. The device of claim 7, wherein the second region of the top surface of the support ring forms a valley below the plane of the first region.

* * * * *

UNITED STATES PATENT AND TRADEMARK OFFICE
CERTIFICATE OF CORRECTION

PATENT NO.      : 7,661,421 B1                                    Page 1 of 1
APPLICATION NO. : 11/134233
DATED           : February 16, 2010
INVENTOR(S)     : Lustig et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1072 days.

Signed and Sealed this

Thirtieth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,661,421 B2 | Page 1 of 1 |
| APPLICATION NO. | : 11/134233 | |
| DATED | : February 16, 2010 | |
| INVENTOR(S) | :Lustig et al. | |

It is certified that error appears in the above-identified patent and that said Letters Patent is hereby corrected as shown below:

Column 1, line 10, delete "moving" and insert instead --move--.
       line 50, after "quality" delete "of".

Column 2, line 55, delete "follows" and insert instead --followers--.
       line 63, after "linkages" delete "which".

Column 3, line 16, after "of" insert --the--.

Column 4, line 36, after "items" insert --from--.
       line 51, after "is" delete "a".
       line 63, after "utilize" insert --a--.

Column 6, line 8, delete "injunction" and insert instead --conjunction--.
       line 9, after "would" insert --be--
       line 19, after "capable" insert --of--.

Signed and Sealed this
Eighth Day of February, 2011

David J. Kappos
*Director of the United States Patent and Trademark Office*